(12) United States Patent
Kim et al.

(10) Patent No.: US 12,300,016 B2
(45) Date of Patent: May 13, 2025

(54) ELECTRONIC DEVICE METHOD FOR ADJUSTING CONFIGURATION DATA OF FINGERPRINT SENSOR

(71) Applicant: Samsung Electronics Co., Ltd., Suwon-si (KR)

(72) Inventors: Suna Kim, Suwon-si (KR); Jinho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/482,633

(22) Filed: Oct. 6, 2023

(65) Prior Publication Data

US 2024/0062575 A1 Feb. 22, 2024

Related U.S. Application Data

(63) Continuation of application No. PCT/KR2023/011837, filed on Aug. 10, 2023.

(30) Foreign Application Priority Data

Aug. 17, 2022 (KR) .................. 10-2022-0102893
Sep. 23, 2022 (KR) .................. 10-2022-0120971

(51) Int. Cl.
*G06V 40/13* (2022.01)
*G06F 3/041* (2006.01)
(Continued)

(52) U.S. Cl.
CPC ...... *G06V 40/1306* (2022.01); *G06F 3/04166* (2019.05); *G06F 3/044* (2013.01);
(Continued)

(58) Field of Classification Search
CPC ......... G06V 40/12–1394; G06V 40/70; G06V 40/00–70; G06V 40/1306;
(Continued)

(56) References Cited

U.S. PATENT DOCUMENTS 9,779,278 B2   10/2017   Nilsson
9,886,613 B2    2/2018   Pi et al.
(Continued)

FOREIGN PATENT DOCUMENTS

CN    110399852 A    11/2019
CN    111985391 A    11/2020
(Continued)

OTHER PUBLICATIONS

International Search Report dated Nov. 8, 2023, issued in International Patent Application No. PCT/KR2023/011837.

*Primary Examiner* — Amr A Awad
*Assistant Examiner* — Aaron Midkiff
(74) *Attorney, Agent, or Firm* — Jefferson IP Law, LLP

(57) ABSTRACT

An electronic device is provided. The electronic device includes a touch display including a touch sensor controller, a fingerprint sensor disposed beneath the touch display, a processor, and memory storing instructions that, when executed by the processor, cause the electronic device to: in response to a touch input to the touch display, obtain, via the touch sensor controller, capacitance data, adjust configuration data for the fingerprint sensor based on the capacitance data, and obtain fingerprint information corresponding to the touch input, using the fingerprint sensor operating with the adjusted configuration data.

14 Claims, 9 Drawing Sheets

(51) Int. Cl.
 *G06F 3/044* (2006.01)
 *G06V 40/70* (2022.01)
(52) U.S. Cl.
 CPC .............. *G06V 40/1318* (2022.01); *G06F 2203/04106* (2013.01); *G06V 40/70* (2022.01)
(58) Field of Classification Search
 CPC ..... G06V 40/1318; G06F 1/16; G06F 3/0393; G06F 3/0416; G06F 3/04661; G06F 3/044–0448; G06F 3/047; G06F 2203/04106; G06F 3/04166–041662; G06F 3/042–0436; G06F 2200/1634; G06F 3/093; G06F 3/0418–04186
 See application file for complete search history.

(56) References Cited

U.S. PATENT DOCUMENTS

| | | |
|---|---|---|
| 9,898,640 B2 | 2/2018 | Ghavanini |
| 10,223,571 B2 | 3/2019 | Evans, V et al. |
| 10,325,133 B2 | 6/2019 | Ghavanini et al. |
| 10,739,134 B2 | 8/2020 | Pang et al. |
| 10,739,913 B2 | 8/2020 | Li |
| 11,567,531 B2 | 1/2023 | Chou et al. |
| 2005/0146383 A1 | 7/2005 | Moore et al. |
| 2014/0139477 A1 | 5/2014 | Immonen et al. |
| 2017/0108961 A1 | 4/2017 | Thorstenson et al. |
| 2017/0199610 A1* | 7/2017 | Kitchens, II ...... G06F 3/041661 |
| 2020/0293743 A1 | 9/2020 | Zhou |
| 2020/0382308 A1 | 12/2020 | Enrico et al. |
| 2021/0200350 A1* | 7/2021 | Withers ................ G06F 3/0416 |
| 2021/0350109 A1 | 11/2021 | Jin et al. |
| 2022/0179540 A1 | 6/2022 | Lee |

FOREIGN PATENT DOCUMENTS

| | | |
|---|---|---|
| CN | 113095287 A | 7/2021 |
| JP | 2005-517930 A | 6/2005 |
| JP | 2012-138026 A | 7/2012 |
| KR | 10-1850378 B1 | 5/2018 |
| KR | 10-2020-0136829 A | 12/2020 |
| KR | 10-2021-0015043 A | 2/2021 |

* cited by examiner

FIG. 7

| TYPES OF FINGERPRINT SENSORS | CONFIGURATION DATA |
| --- | --- |
| FIRST FINGERPRINT SENSOR (ULTRASONIC) | 1. ULTRASONIC FREQUENCY<br>2. CAPTURE TIME POINT |
| SECOND FINGERPRINT SENSOR (OPTICAL) | 1. LUMINANCE OF LIGHT SOURCE<br>2. INTEGRATION TIME<br>3. FOCAL LENGTH |

ELECTRONIC DEVICE METHOD FOR ADJUSTING CONFIGURATION DATA OF FINGERPRINT SENSOR

CROSS-REFERENCE TO RELATED APPLICATION(S)

This application is a continuation application, claiming priority under § 365(c), of an International application No. PCT/KR2023/011837, filed on Aug. 10, 2023, which is based on and claims the benefit of a Korean patent application number 10-2022-0102893, filed on Aug. 17, 2022, in the Korean Intellectual Property Office, and of a Korean patent application number 10-2022-0120971, filed on Sep. 23, 2022, in the Korean Intellectual Property Office, the disclosure of each of which is incorporated by reference herein in its entirety.

TECHNICAL FIELD

The disclosure relates to an electronic device and a method for adjusting configuration data of a fingerprint sensor.

BACKGROUND ART

In an electronic device, a physical button (e.g., a home key) positioned on a front surface may be removed and a user interface may be displayed on a display to replace the removed physical button in a situation where an area occupied by the display is increasingly enlarged. For example, when the physical button is removed, a biometric sensor included with the physical button may be disposed beneath the display of the electronic device. For example, a fingerprint sensor, which is one of the biometric sensors, may be disposed beneath the display, and some area of the display may be configured as a fingerprint detection area that recognizes a user's fingerprint in response to a point (e.g., position, coordinates) at which the fingerprint sensor is disposed.

The electronic device may detect a user's touch input to the configured fingerprint detection area, and obtain the user's fingerprint information according to the touch input. The electronic device may perform a user authentication function on the basis of the obtained fingerprint information.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

As the display becomes more utilizable, users may attach a protective member (e.g., protective film, tempered glass, or the like) to a surface of the display to protect the display from impact from the external environment. When the protective member is attached to the display, the electronic device may be as thick as a thickness of the protective member. For example, the display may include a touch sensor based on a capacitance method, and the capacitive touch sensor may be sensitive to a distance between conductors (e.g., a touch input means, or a finger). In the electronic device having the protective member attached to the display surface, due to the protective member, the distance between the touch sensor and the conductor becomes relatively farther, and as the distance from the conductor increases, it may be difficult to accurately obtain information on the conductor (e.g., fingerprint information). For example, sensitivity to touch input may be reduced by attaching the protective member.

Solution to Problem

Aspects of the disclosure are to address at least the above-mentioned problems and/or disadvantages and to provide at least the advantages described below. Accordingly, an aspect of the disclosure is to provide an electronic device for using a touch sensor on a display to detect whether a protective member (e.g., protective film, tempered glass) is attached to the display. The electronic device may change configuration data (e.g., configuration values) for a fingerprint sensor disposed beneath the display in response to a situation in which a protective member is attached. According to an embodiment, sensing performance for the fingerprint sensor is maintained even when the protective member is attached to one side of the display, which may improve usability of the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a touch display including a touch sensor controller, a fingerprint sensor disposed beneath the touch display, a processor, and memory storing instructions that, when executed by the processor, cause the electronic device to: in response to a touch input to the touch display, obtain, via the touch sensor controller, capacitance data, adjust configuration data for the fingerprint sensor based on the capacitance data, and obtain fingerprint information corresponding to the touch input, using the fingerprint sensor operating with the adjusted configuration data.

In a method of adjusting configuration data of the fingerprint sensor disposed beneath the touch display according to an embodiment, in response to a touch input to a touch display, capacitance data corresponding to the touch input may be obtained. The method according to an embodiment may adjust the configuration data for the fingerprint sensor based on the capacitance data. The method according to an embodiment may obtain fingerprint information corresponding to the touch input, using the fingerprint sensor operating with the adjusted configuration data.

According to an embodiment, a non-transitory computer-readable storage medium (or computer program product) storing one or more programs may be described. According to an embodiment, one or more programs includes instructions that, when executed by a processor of the electronic device, in response to a touch input to a touch display, include obtaining capacitance data in response to the touch input to the touch display, adjusting, based on the capacitance data, configuration data for the fingerprint sensor, and obtaining fingerprint information corresponding to the touch input, using the fingerprint sensor operating with the adjusted configuration data.

An embodiment may enable the electronic device to detect the protective member being attached to a surface of the display, and in response to the attachment of the protective member, adjust configuration data (e.g., configuration information) for a sensor (e.g., fingerprint sensor) disposed beneath the display. For example, the electronic device may automatically detect whether the protective member is attached to the display. The electronic device may, in response to the attachment of the protective member, automatically change the configuration data of a sensor disposed beneath the display (e.g., the fingerprint sensor) based on the thickness of the protective member, and/or provide guide information for the user to change the configuration data. According to an embodiment, the electronic device may be automatically controlled to ensure that a sensor (e.g., the fingerprint sensor) disposed beneath the display maintains optimal performance, even in a situation in which the protective member is attached to the display. The electronic device according to an embodiment may improve usability for the fingerprint sensor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 7 is a view illustrating a table for adjusting configuration data for the fingerprint sensor based on the thickness of the protective member according to an embodiment of the disclosure.

Throughout the drawings, it should be noted that like reference numbers are used to depict the same or similar elements, features, and structures.

MODE FOR THE DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
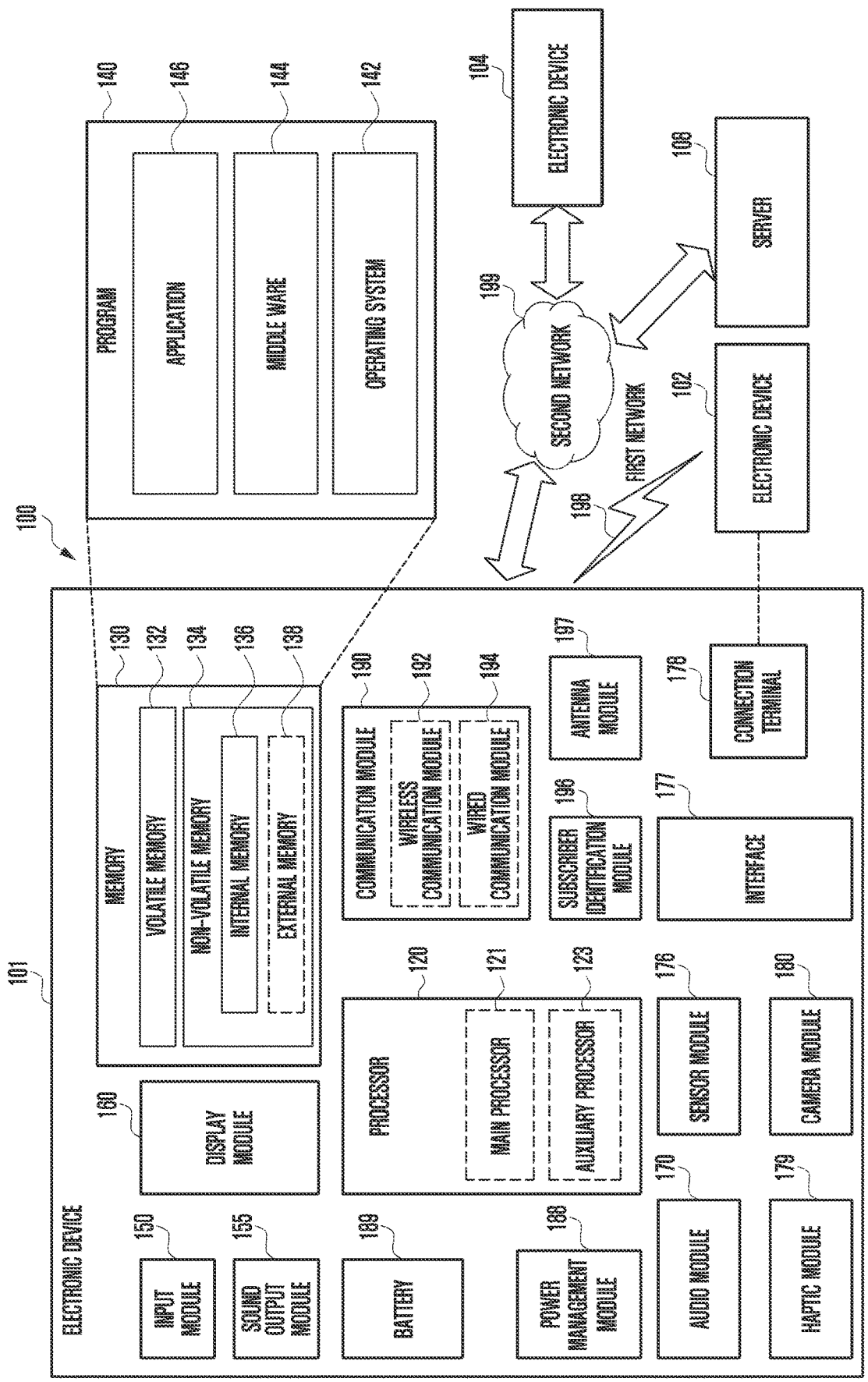
FIG. 1 is a block diagram of an electronic device in a network environment according to an embodiment of the disclosure.

FIG. 1 is a block diagram illustrating an example electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
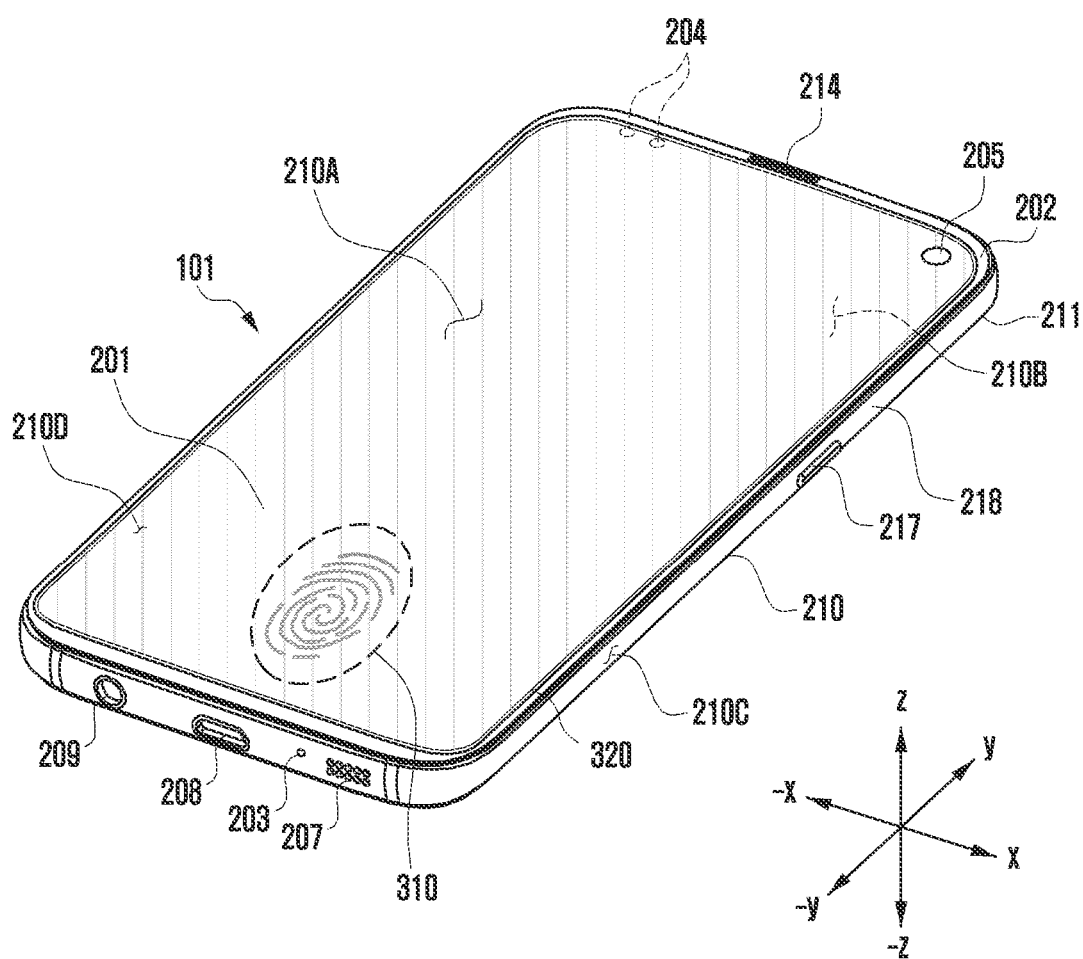
FIG. 2 is a view illustrating a front surface of an electronic device according to an embodiment of the disclosure.

FIG. 2 is a view illustrating a front surface of the electronic device according to an embodiment of the disclosure.

Referring to FIG. 2, an electronic device 101 (e.g., the electronic device 101 in FIG. 1) according to an embodiment may include a housing 210 including a first surface (or front surface) 210A, a second surface (or rear surface) 210B, and a side surface 210C enclosing a space (or inner space) between the first surface 210A and the second surface 210B. In an embodiment (not illustrated), the housing 210 may refer to a structure that forms some of the first surface 210A, the second surface 210B, and the side surface 210C. According to an embodiment, the first surface 210A may be formed by a front surface plate 202 (e.g., a glass plate comprising various coating layers, or a polymer plate) that is at least partially and substantially transparent. The second surface 210B may be formed by a rear surface plate 211 that may be transparent, or may be opaque. The rear surface plate 211 may be formed, for example, of coated or tinted glass, ceramic, polymer, metal (e.g., aluminum, stainless steel (STS), or magnesium), or a combination of at least two of the above materials. The side surface 210C, which is coupled with the front surface plate 202 and the rear surface plate 211, may be formed by a side surface bezel structure (or lateral member) 218 that includes a metal and/or polymer. In some embodiments, the rear surface plate 211 and the side surface bezel structure 218 may be integrally formed and include the same material (e.g., a metallic material such as aluminum).

According to an embodiment, the electronic device 101 may include at least one of a display 201, an audio module 203, 207, and 214, a sensor module 204 (e.g., a fingerprint sensor 310), a camera module 205, a key input device 217, an indicator (not illustrated), or connector holes 208 and 209. In some embodiments, the electronic device 101 may omit at least one of the constituent elements (e.g., the key input device 217, the indicator, and/or the connector holes 208 and 209) and/or may additionally include other constituent elements.

According to an embodiment, the display 201 may be visually exposed through a substantial portion of the front surface plate 202. In some embodiments, at least a portion of the display 201 may be visually exposed through the front surface plate 202, which forms the first surface 210A, and a first area 210D of the side surface 210C. In some embodiments, edges of the display 201 may be formed to be substantially the same as adjacent outline shapes of the front surface plate 202. In an embodiment (not illustrated), a spacing between an outline of the display 201 and the outline of the front surface plate 202 may be formed to be substantially the same to expand the area to which the display 201 is exposed.

In an embodiment (not illustrated), a recess or opening may be formed in a portion of a screen display area of the display 201, and at least one of the audio module 214, the sensor module 204, the camera module 205, or the indicator aligned with the recess or opening may be included in a portion of the screen display area. In an embodiment (not illustrated), the audio module 214, sensor module 204, camera module 205, or indicator may be included on a rear surface of the screen display area of the display 201. For example, the audio module 214, camera module 205, sensor module 204, and/or indicator may be disposed to interface with an external environment through an opening perforated from an inner space of the electronic device 101 to the front surface plate 202 of the display 201. In another example, some of the sensor modules 204, camera module 205, and/or indicator may be disposed in the inner space of the electronic device 101 to perform the functions without being visually exposed through the front surface plate 202. In an example, an area of the display 201 that faces the sensor module 204, camera module 205, and/or indicator may not require a perforated opening.

In an embodiment (not illustrated), the display 201 may be coupled or disposed adjacent to a touch detection circuit, a pressure sensor capable of measuring intensity (pressure) of a touch, and/or a digitizer capable of detecting a magnetic stylus pen. In some embodiments, at least a portion of the sensor module 204, and/or at least a portion of the key input device 217, may be disposed in the first area 210D.

According to an embodiment, the fingerprint sensor 310 may be disposed in the inner space of the electronic device 101, which corresponds to a rear surface of the display 201. For example, some areas of the first surface 210A of the display 201 may be utilized as a fingerprint sensing area based on the fingerprint sensor 310. The fingerprint sensing area may be formed based on a position in which the fingerprint sensor 310 is disposed. According to an embodiment, the fingerprint sensor 310 may include one of a first fingerprint sensor based on an ultrasonic method and a second fingerprint sensor based on an optical method. According to an embodiment, the fingerprint sensor 310 is not limited to a fingerprint sensor according to a specified method. According to an embodiment, the fingerprint sensor 310 may be activated in response to an event related to fingerprint authentication, and may obtain fingerprint information in response to a touch input based on the fingerprint sensing area. The electronic device 101 may perform fingerprint authentication based on the obtained fingerprint information.

According to an embodiment, the audio modules 203, 207, and 214 may include microphone holes 203 and speaker holes 207 and 214. The microphone hole 203 may have a microphone disposed therein to obtain sound from the outside, and in some embodiments, a plurality of microphones may be disposed therein to detect a direction of sound. The speaker holes 207 and 214 may include an external speaker hole 207 and a receiver hole 214 for calls. In some embodiments, the speaker holes 207 and 214 and microphone hole 203 may be implemented as a single hole, or a speaker (e.g., a piezo speaker) may be included without the speaker holes 207 and 214.

According to an embodiment, the sensor module 204 may generate an electrical signal or a data value that corresponds to an inner operational state of the electronic device 101, or an external environmental state. The sensor module 204 may include, for example, a first sensor module 204 disposed on the first surface 210A of the housing 210 (e.g., a proximity sensor) and/or a second sensor module 310 disposed on the rear surface of the display 201 (e.g., a fingerprint sensor) and/or a third sensor module (not illustrated) disposed on the second surface 210B of the housing 210 (e.g., a heart rate monitor (HRM) sensor). For example, the fingerprint sensor 310 (e.g., an ultrasonic fingerprint sensor or an optical fingerprint sensor) may be disposed at least partially beneath the display 201 of the first surface 210A. According to an embodiment, the fingerprint sensor 310 is not limited to being disposed beneath the display 201 and may be disposed in the form that is at least partially coupled to the display 201, or in the form that is stacked over the whole surface or the whole area of the first surface 210A. The electronic device 101 may further include at least one of a sensor module not illustrated, such as a gesture sensor, a gyro sensor, a barometric pressure sensor, a magnetic sensor, an accelerometer, a grip sensor, a color sensor, an infrared sensor, a biometric sensor, a temperature sensor, a humidity sensor, or a light sensor 204.

According to an embodiment, the camera module 205 may include a first camera device disposed on the first surface 210A of the electronic device 101, and a second camera device (not illustrated) and/or flash (not illustrated) disposed on the second surface 210B. The camera module 205 may include one or a plurality of lenses, an image sensor, and/or an image signal processor. The flash (not illustrated) may include, for example, a light-emitting diode (LED) or a xenon lamp. In some embodiments, two or more lenses (an infrared camera, a wide-angle and a telephoto lens) and image sensors may be disposed on one surface of the electronic device 101.

According to an embodiment, the key input device 217 may be disposed on the side surface 210C of the housing 210. In an embodiment, the electronic device 101 may not include some or all of the key input devices 217, and the non-included key input devices 217 may be implemented in the form of a soft key on the display 201. In some embodiments, the key input device 217 may be implemented using a pressure sensor included in the display 201.

According to an embodiment, the indicator (not illustrated) may be disposed on the first surface 210A of the housing 210. The indicator may, for example, provide status information of the electronic device 101 in the form of light. In an embodiment, the indicator may provide a light source that is in conjunction with an operation of the camera module 205, for example. The indicator may include, for example, LEDs, IR LEDs, and xenon lamps.

According to an embodiment, the connector holes 208 and 209 may include a first connector hole 208 to accommodate a connector (e.g., a USB connector) capable of transmitting power and/or data to and from an external electronic device, and/or a second connector hole (e.g., an earphone jack) 209 to accommodate a connector capable of transmitting audio signals to and from an external electronic device.

According to an embodiment, the electronic device 101 may have a protective member 320 (e.g., a protective film, or tempered glass) attached that covers the first surface 210A of the display 201. The protective member 320 may protect the display 201 from external impacts that may occur in an external environment. When the protective member 320 is attached to the first surface 210A of the display 201, the electronic device 101 may become as thick as a thickness of the protective member 320, and the distance between a touch panel (e.g., a touch sensor, touch sensor controller) included in the display 201 and a touch point (e.g., a touch point based on user input) may be as far away as the thickness of the protective member 320. According to an embodiment, the electronic device 101 may detect, by means of the display 201, the amount of change in capacitance in response to a user's touch input. When the protective member 320 is attached to the first surface 210A of the display 201, the touch panel of the display 201 and the point at which a user's touch input is detected may be relatively far apart by the thickness of the protective member 320, thereby reducing sensitivity to the user's touch input. For example, the amount of change in capacitance in response to a user's touch input may decrease.

According to an embodiment, the electronic device 101 may detect a user's touch input to the display 201 at a plurality of time points, and may obtain capacitance data based on the user's touch input. For example, a table related to capacitance data may have been previously stored in a memory (e.g., the memory 130 in FIG. 1) by the electronic device 101. The table related to the capacitance data may include measured experimental data, based on the thickness of the protective member 320 attached to the display 201. According to an embodiment, the electronic device 101 may determine, based on the obtained capacitance data, whether the protective member 320 is attached to the first surface 210A of the display 201 and/or what the thickness of the protective member 320 is. The electronic device 101 may identify the thickness of the protective member 320, and may adjust the configuration data (e.g., configuration value) for the fingerprint sensor 310 disposed on the rear surface of the display 201 based on the identified thickness of the protective member 320.

Figure 3:
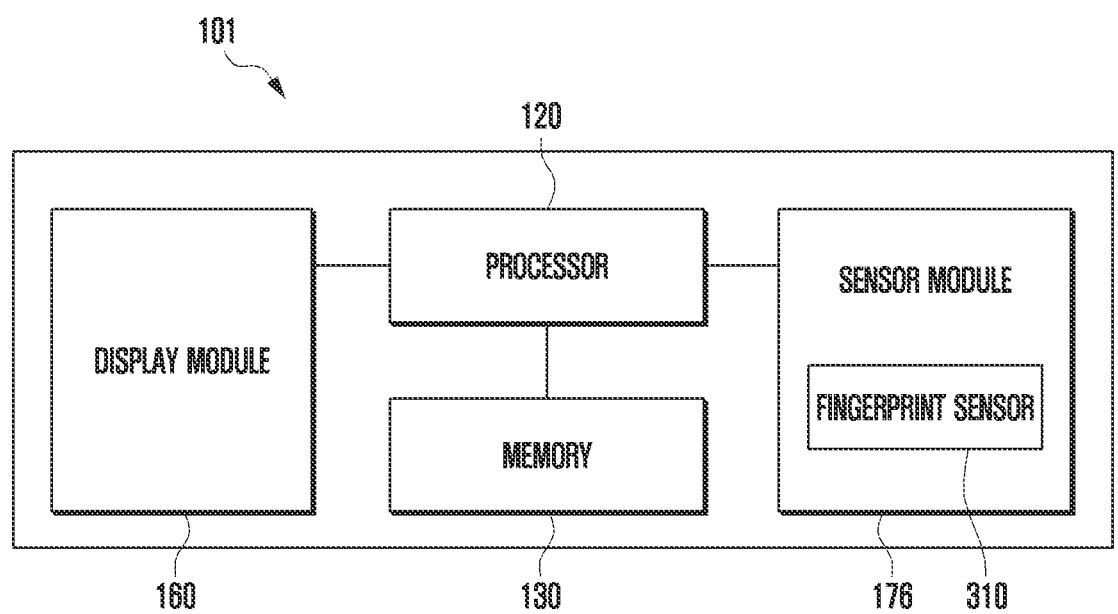
FIG. 3 is a block diagram illustrating the electronic device according to an embodiment of the disclosure.

FIG. 3 is a block diagram illustrating the electronic device according to an embodiment of the disclosure.

The electronic device 101 in FIG. 3 may be at least partially similar to the electronic device 101 in FIG. 1 and/or the electronic device 101 in FIG. 2, or may further include other embodiments of the electronic device 101.

Referring to FIG. 3, an electronic device (e.g., the electronic device 101 of FIG. 1) may include a processor (e.g., the processor 120 of FIG. 1), a memory (e.g., the memory 130 of FIG. 1), a display module (e.g., the display module 160 of FIG. 1), and/or a sensor module (e.g., the sensor module 176 of FIG. 1). According to an embodiment, the sensor module 176 may include a fingerprint sensor (e.g., the fingerprint sensor 310 of FIG. 2) to obtain fingerprint information based on a user's touch input.

According to an embodiment, the electronic device 101 may include the fingerprint sensor 310 disposed at least partially beneath (e.g., on the rear surface of) the display module 160, and may use the fingerprint sensor 310 to obtain fingerprint information in response to a user's touch input. For example, the electronic device 101 may identify a touch input to an area of the display module 160 (e.g., the fingerprint sensing area) and, using the fingerprint sensor 310, obtain fingerprint information corresponding to the identified touch input. For example, the fingerprint sensor 310 may be disposed beneath the display module 160 and may not be visually visible. In response to a fingerprint authentication-related event, the electronic device 101 may at least partially activate the fingerprint sensor 310 and obtain fingerprint information based on the user's touch input. The fingerprint authentication-related event may include, for example, an execution of an application, or various inputs or requests that require fingerprint authentication. For example, the electronic device 101 may at least partially display the fingerprint sensing area on the display module 160 when activating the fingerprint sensor 310, and obtain fingerprint information based on a user's touch input based on the fingerprint sensing area. According to an embodiment, the fingerprint sensor 310 may include a fingerprint sensor based on an ultrasonic method and/or a fingerprint sensor based on an optical method.

According to an embodiment, the electronic device 101 may have a protective member (e.g., the protective member 320 in FIG. 2) attached to a surface of the display module 160. The protective member may protect the display module 160 from external impact, and may include a protective film or tempered glass. For example, the protective member may be implemented in a variety of materials, such as a polyethylene terephthalate (PET) based film (e.g., protective film) and/or a glass based film (e.g., tempered glass). For example, the protective member may be implemented as a transparent material to maintain visibility of a screen displayed by means of the display module 160. According to an embodiment, the protective member is not limited to a specific material and may be designed to vary in thickness.

According to an embodiment, since a relative distance between the touch sensor (e.g., touch panel) included in the display module 160 and the touch point is greater as the thickness of the protective member increases, sensitivity to a touch input may decrease. When the thickness of the protective member is thicker, touch sensitivity to a touch input may be reduced. For example, in obtaining capacitance data in response to a user's touch input, the electronic device 101 may obtain capacitance data with a relatively low value when the thickness of the protective member is thicker.

According to an embodiment, the processor 120 of the electronic device 101 may identify touch inputs entered at a plurality of time points by means of the display module 160, and may obtain a plurality of capacitance data corresponding to the identified touch inputs. In an embodiment, the processor 120 may determine, based on the obtained capacitance data, whether the protective member is attached to one surface of the display module 160 or, in case that the protective member is attached, what the thickness of the protective member is.

According to an embodiment, the processor 120 of the electronic device 101 may change configuration data (e.g., configuration values related to obtaining fingerprint information) for the fingerprint sensor 310 based on the thickness of the protective member. For example, a thicker protective member may allow the processor 120 to adjust a higher configuration value for the fingerprint sensor 310, and use the fingerprint sensor 310 with the higher configuration value to obtain clearer and more accurate fingerprint information. The fingerprint sensor 310 may improve fingerprint sensing performance when the configuration value is adjusted to a higher value. The processor 120 may identify the thickness of the protective member (e.g., the distance between the touch sensor and the touch point), and may adaptively adjust the configuration data related to fingerprint authentication for the fingerprint sensor 310 based on the identified thickness of the protective member.

According to an embodiment, the processor 120 of the electronic device 101 may execute a program stored in the memory 130 (e.g., the program 140 of FIG. 1) to control at least one other component element (e.g., a hardware or software component element), and may perform various data processing or computations. According to an embodiment, the processor 120 may be operatively, functionally, and/or electrically coupled to the display module 160, sensor module 176, and/or memory 130.

According to an embodiment, the processor 120 may at least partially activate the fingerprint sensor 310 in response to a fingerprint authentication-related event, and may use the activated fingerprint sensor 310 to obtain fingerprint information based on a user input. According to an embodiment, the processor 120 may identify the thickness of the protective member attached to the display module 160, and may adjust the configuration data (e.g., configuration value) for the fingerprint sensor 310 based on the thickness of the protective member.

According to an embodiment, the processor 120 of the electronic device 101 may obtain capacitance data corresponding to a user's input, based on the touch sensor included in the display module 160. The memory 130 may store capacitance data obtained at a plurality of time points. For example, capacitance data may be obtained differently depending on the distance between the touch sensor and the touch point. The memory 130 may store capacitance data that is designated differently for each distance between the touch sensor and the touch point. The processor 120 may determine the distance between the touch sensor and the touch point based on the obtained capacitance data. According to an embodiment, configuration values for the fingerprint sensor 310 may be stored in the memory 130, based on the distance between the touch sensor and the touch point. According to an embodiment, the processor 120 may identify the distance between the touch sensor and the touch point, and may automatically or manually adjust the configuration data (e.g., configuration values) for the fingerprint sensor 310 based on the identified distance. For example, the processor 120 may provide a user with a guide to adjust the configuration data for the fingerprint sensor 310 and, in response to the user's selection, may adjust the configuration data for the fingerprint sensor 310.

According to an embodiment, the display module 160 may include a touch sensor to detect a touch input from a user. For example, the display module 160 may be designed as a plurality of stacked panels, and may include a touch sensor controller. For example, the touch sensor controller may be a portion of the touch sensor. In an embodiment, the touch panel may be integrally implemented into a display panel, among a plurality of panels included in the display module 160. In an embodiment, the processor 120 may at least partially activate the touch panel (e.g., touch sensor, touch sensor controller, touch display) in response to an activation of the display module 160, and may detect a user input based on the touch panel. The processor 120 may obtain capacitance data (e.g., capacitance values) corresponding to a user input based on the touch panel. The capacitance data may include the amount of change in the capacitance value. According to an embodiment, the capacitance data may be determined based on the distance between the touch sensor and the touch point. For example, the amount of change in a capacitance value may be greater when a distance between the touch sensor and the touch point is closer, and the amount of change in the capacitance may be smaller when the distance is greater. According to an embodiment, the electronic device 101 may have a protective member attached to a surface of the display module 160, and a thickness of the protective member may increase a distance between the touch sensor and the touch point. Capacitance data obtained by a touch input may be smaller due to a protective member attached to a surface of the display module 160.

According to an embodiment, the fingerprint sensor 310 may be disposed at least partially beneath (e.g., on a rear surface) of the display module 160. For example, the fingerprint sensor 310 may be disposed beneath the display module 160, and a position in which the fingerprint sensor 310 is disposed may not be visually identified. According to an embodiment, performance of obtaining fingerprint information by means of the fingerprint sensor 310 may change depending on a distance between the fingerprint sensor 310 and a touch point. For example, in the processor 120, fingerprint sensing performance for fingerprint sensor 310 may decrease as the distance between the fingerprint sensor 310 and the touch point increases. In an embodiment, configuration values (e.g., data related to fingerprint sensing performance) for the fingerprint sensor 310 may be adjusted to increase fingerprint sensing performance for the fingerprint sensor 310. According to an embodiment, the processor 120 may identify situations in which fingerprint sensing performance is degraded (e.g., due to a lack of protective member, increasing the distance between the fingerprint sensor 310 and the touch point) and adjust the configuration values for the fingerprint sensor 310 to improve fingerprint sensing performance.

According to an embodiment, the sensor module 176 may include the fingerprint sensor 310 to obtain fingerprint information of a user. For example, the fingerprint sensor 310 may be disposed beneath (e.g., on a rear surface) of the display module 160 and may obtain fingerprint information in response to a user input. According to an embodiment, a fingerprint sensing area may be implemented based on a position in which the fingerprint sensor 310 is disposed. The processor 120 may, in response to a fingerprint authentication-related event, at least partially activate the fingerprint sensor 310 and obtain fingerprint information based on a user input by means of the activated fingerprint sensor 310. For example, the processor 120 may guide and visually display a fingerprint sensing area, by means of the display module 160, and obtain a user input (e.g., fingerprint information) based on the displayed fingerprint sensing area. According to an embodiment, the fingerprint sensor 310 may have predetermined configuration values to accurately acquire fingerprint information. For example, the configuration value may be determined based on a distance between a touch sensor included in the display module 160 and a touch point (e.g., a touch input area on a surface of the display module 160, a finger position of a user). For example, the configuration value may be configured to be higher as the distance increases. As the distance increases, the user's finger position becomes relatively farther away. Therefore, the processor 120 may adjust the configuration value for the fingerprint sensor 310 to a higher value to more accurately obtain fingerprint information based on the touch input.

According to an embodiment, the processor 120 of the electronic device 101 may detect a touch input from a user at a plurality of time points by means of the display module 160. The processor 120 may use a touch sensor included in the display module 160 to obtain a plurality of capacitance data (e.g., capacitance values) corresponding to the plurality of touch inputs. For example, the memory 130 may have capacitance data stored in the form of a table based on the distance between the touch sensor and the touch point. The processor 120 may identify the distance between the touch sensor and the touch point (e.g., the thickness of the protective member attached to the display module 160) based on the capacitance data. The processor 120 may adjust the configuration data (e.g., configuration values) for the fingerprint sensor 310 disposed beneath the display module 160 based on the distance between the identified touch sensor and the touch point. For example, the configuration data may be adjusted to improve fingerprint sensing performance for the fingerprint sensor 310 as the distance between the touch sensor and the touch point increases. According to an embodiment, the memory 130 of the electronic device 101 may store a table of imaging parameters based on the distance between the touch sensor and the touch point (e.g., the thickness of the protective member attached to the display module 160). For example, the table of imaging parameters may include configuration data for the fingerprint sensor 310 for optimal fingerprint sensing performance by a "thickness of protective member". According to an embodiment, the processor 120 may adjust the configuration data for the fingerprint sensor 310 to a first configuration value when the protective member is a first thickness, and to a second configuration value when the protective member is a second thickness, based on the table of imaging parameters stored in the memory 130.

According to an embodiment, the processor 120 may identify a type of fingerprint sensor 310 (e.g., an ultrasonic fingerprint sensor, or an optical fingerprint sensor) and adjust the configuration data corresponding to the corresponding fingerprint sensor. For example, the processor 120 may adjust the CONFIGURE data corresponding to at least one of an ultrasonic frequency for the ultrasonic fingerprint sensor or a capture time point of the fingerprint information (e.g., fingerprint image) based on a touch input. In another example, the processor 120 may adjust the configuration data corresponding to at least one of a luminance value of a light source for an optical fingerprint sensor, integration time, or focal length for a touch input. According to an embodiment, the table of imaging parameters stored in the memory 130 may include various configuration values for each type of fingerprint sensor 310 (e.g., ultrasonic fingerprint sensor and/or optical fingerprint sensor), based on the thickness of the protective member. For example, the processor 120 may adjust the configuration data differently depending on the type of fingerprint sensor 310 identified based on the imaging parameter table.

According to an embodiment, the processor 120 of the electronic device 101 may automatically or manually adjust the configuration data for the fingerprint sensor 310 to ensure that the fingerprint sensor 310 maintains optimal sensing performance in a situation in which the protective member is attached to the surface of the display module 160. The electronic device 101 may improve usability for the fingerprint sensor 310.

According to various embodiments, an electronic device (e.g., the electronic device 101 in FIGS. 1, 2, and/or 3) may include a display (e.g., the display module 160 in FIGS. 1 and/or 3) including a touch panel (e.g., touch sensor, touch sensor controller, touch display), a fingerprint sensor disposed beneath the display 160 (e.g., the fingerprint sensor 310 in FIG. 3), a memory (e.g., the memory 130 in FIGS. 1 and/or 3), a display 160, and a processor operatively connected to the fingerprint sensor 310, and memory 130 (e.g., the processor 120 in FIGS. 1 and/or 3). The processor 120 may, in response to a touch input to the touch panel, obtain capacitance data corresponding to the touch input. The processor 120 may identify the thickness of the protective member attached to the display 160 based on the obtained capacitance data. The processor may adjust the configuration data for the fingerprint sensor 310 based on the identified thickness of the protective member.

According to an embodiment, the fingerprint sensor 310 is disposed at least partially on the rear surface of the display 160, and fingerprint information may be obtained via the fingerprint sensing area formed based on a position in which the fingerprint sensor 310 is disposed.

According to an embodiment, the processor 120 may detect a touch input via the fingerprint sensing area and obtain fingerprint information based on the touch input using the fingerprint sensor 310 configured based on the configuration data.

According to an embodiment, the processor 120 may identify a distance between the touch panel and a touch point at which a touch input occurs based on the obtained capacitance data, and adjust the configuration data for the fingerprint sensor 310 based on the identified distance.

According to an embodiment, as the distance between the touch panel and the touch point increases, the amount of change in the capacitance data corresponding to the touch input becomes greater, and the amount of change in the configuration data for the fingerprint sensor 310 may be determined based on the amount of change in the capacitance data.

According to an embodiment, the fingerprint sensor 310 may include a first fingerprint sensor in an ultrasound manner (e.g., a first fingerprint sensor in FIG. 7) that uses ultrasound signals to obtain fingerprint information, and a second fingerprint sensor in an optical manner (e.g., a second fingerprint sensor in FIG. 7) that uses an optical signals to obtain fingerprint information.

According to an embodiment, configuration data for the first fingerprint sensor may include an ultrasonic frequency and a capture time point for obtaining the fingerprint information. According to an embodiment, in adjusting the configuration data for the first fingerprint sensor, the processor 120 may adjust the configuration data for at least one of the ultrasonic frequency or the capture time point based on the table of imaging parameters stored in the memory 130.

According to an embodiment, the configuration data for the second fingerprint sensor may include luminance data of the light source, integration time, and a focal length to obtain fingerprint information. According to an embodiment, in adjusting the configure data for the second fingerprint sensor, the processor 120 may adjust the configuration data for at least one of luminance data, integration time, or a focal length based on the table of imaging parameters stored in the memory 130.

According to an embodiment, the memory 130 may store a table (e.g., a table of imaging parameters) that is implemented based on a thickness of a protective member, capacitance data configured in response to the thickness of the protective member, a type of protective member, and capacitance data configured in response to the type of protective member. For example, the table of imaging parameters may be stored in the memory 130 with an initial configuration value determined, or the configuration value may be determined on the basis of data collected by operating the electronic device 101. According to an embodiment, the table of imaging parameters, while a plurality of data is accumulated, may be updated based on the accumulated data. For example, data of the table of imaging parameters may be distinguished by type of protective member, and capacitance data may be stored corresponding to a thickness of a specific type of protective film. Various data may be stored in the table of imaging parameters, which may be distinguished by type of fingerprint sensor 310 or, alternatively, by user. According to an embodiment, the processor 120 may configure a threshold value corresponding to the capacitance data, based on the table stored in the memory 130 (e.g., the table of imaging parameters). In case that the obtained capacitance data exceeds the configured threshold value, the processor 120 may identify the thickness of the protective member based on the capacitance data, depending on the type of protective member attached to the display.

According to an embodiment, the protective member may include at least one of a polyethylene terephthalate (PET) based film or a glass based film.

Figure 4:
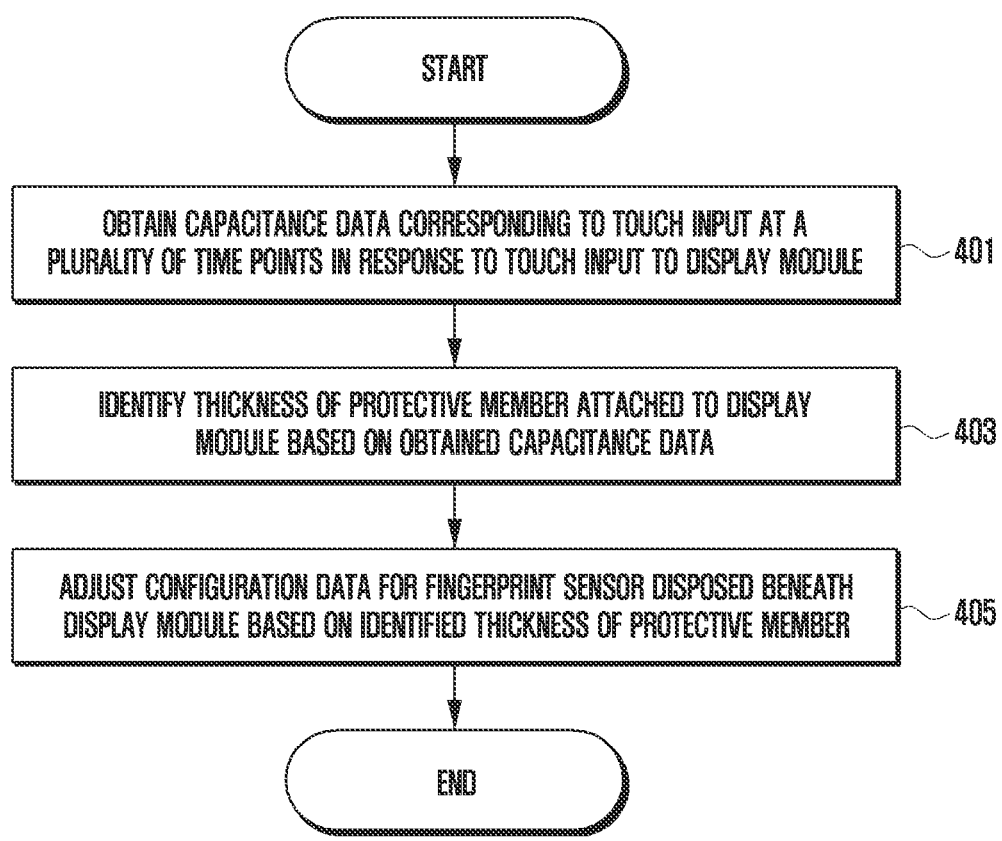
FIG. 4 is a flowchart illustrating a method of changing a configuration of a fingerprint sensor according to an embodiment of the disclosure.

FIG. 4 is a flowchart illustrating a method of changing a configuration of a fingerprint sensor according to an embodiment of the disclosure.

In embodiments below, each operation may be performed sequentially, but is not required to be performed sequentially. For example, the order of each operation may be changed, and at least two operations may be performed in parallel.

The electronic device 101 in FIG. 4 may be at least partially similar to the electronic device 101 in FIG. 1 and/or the electronic device 101 in FIG. 2, or may further include other embodiments of the electronic device 101.

According to an embodiment, the electronic device 101 may include a fingerprint sensor (e.g., the fingerprint sensor 310 in FIG. 3) disposed at least partially beneath (e.g., on a rear surface of) the display module (e.g., the display module 160 in FIG. 3) to obtain fingerprint information based on a touch input received by means of the display module 160. The electronic device 101 may be in a state in which a protective member (e.g., a protective film, or tempered glass) is at least partially attached to a surface of the display module 160 to protect the display module 160 from cracking or scratching due to an impact generated by an external environment. For example, in case that the protective member is attached to the surface of the display module 160, the protective member may degrade sensing performance for the touch sensor and/or fingerprint sensor 310 included in the display module 160 of the electronic device 101.

In operation 401, a processor of the electronic device 101 (e.g., the processor 120 in FIG. 3) may, in response to a touch input to the display module 160, obtain capacitance data (e.g., a capacitance value) corresponding to the touch input at a plurality of time points. For example, the processor 120 may at least partially activate the touch sensor (e.g., touch panel, touch sensor controller, touch display) included in the display module 160, and may use the activated touch sensor to detect touch inputs from a plurality of time points. The processor 120 may store capacitance data for the touch inputs obtained at the plurality of time points in the memory (e.g., memory 130 in FIG. 3). For example, processor 120 may store a table form of a table of imaging parameters in memory 130, based on capacitance data for the touch inputs obtained at the plurality of time points.

In operation 403, the processor 120 may identify a thickness of the protective member attached to the display module 160 based on the obtained capacitance data. According to an embodiment, the memory 130 may have pre-stored capacitance data in the form of a table (e.g., an imaging parameter table) in response to a user's touch input by means of the display module 160. For example, capacitance data in the form of a table (e.g., a table of imaging parameters) may include data values that have been determined in advance by experimentation. For example, in consideration of at least one of a plurality of touch time points, a plurality of touch points, temperature, or usage patterns, a table form of capacitance data may be determined and stored in the memory 130 of the electronic device 101. The imaging parameter data stored in the memory 130 may be updated based on capacitance data obtained at the plurality of time points. According to an embodiment, the processor 120 may compare the capacitance data obtained at the plurality of time points with capacitance data in the form of a table (e.g., a table of imaging parameters) stored in the memory 130. The processor 120 may identify a thickness (e.g., a distance between a touch sensor and a touch point (e.g., a touch input area, touch coordinates for a surface of the display module 160)) of the protective member attached to the display module 160 based on a result of the above described comparison. For example, the electronic device 101 may be in a state in which the protective member is attached to the display module 160 to protect the display module 160 from external impact. As the protective member is attached, the distance between the touch sensor and the touch point may be in a state being increased by the thickness of the protective member. In case that the distance between the touch sensor and the touch point increases, the amount of change in the capacitance data in response to a touch input may be smaller. Sensitivity to detect a user's touch input may be degraded. The processor 120 may identify the thickness of the protective member based on the capacitance data.

In operation 405, the processor 120 may adjust configuration data for the fingerprint sensor 310 disposed beneath the display module 160 based on the identified thickness of the protective member. For example, the fingerprint sensor 310 may include an ultrasonic fingerprint sensor that uses ultrasound signals to obtain fingerprint information and/or an optical fingerprint sensor that uses optical signals (e.g., in an optical manner) to obtain fingerprint information. According to an embodiment, the fingerprint sensor 310 is not limited in any specific manner. The fingerprint sensor 310 may be in a state of being disposed beneath (e.g., on a rear surface) of the display module 160, which may degrade fingerprint sensing performance as a user's touch point is moved further away by the thickness of the protective member. The processor 120 may adjust the configuration data for the fingerprint sensor 310 to compensate for the reduced fingerprint sensing performance due to the thickness of the protective member. According to an embodiment, in case that the fingerprint sensor 310 is an ultrasonic fingerprint sensor, the processor 120 may change an ultrasonic frequency, and/or change a capture time point (e.g., timing) for a fingerprint image. For example, the processor 120 may increase and/or decrease the ultrasonic frequency to improve fingerprint sensing performance of the fingerprint sensor 310 (e.g., in an ultrasonic manner). The processor 120 may pull or push back the capture time point for the fingerprint image to improve fingerprint sensing performance of the fingerprint sensor 310. According to another embodiment, in case that the fingerprint sensor 310 is an optical fingerprint sensor, the processor 120 may change luminance of a light source, change integration time (e.g., increase or decrease), or change a focal length for a user's touch point. For example, the processor 120 may increase or decrease luminance of a light source and/or increase or decrease integration time to improve fingerprint sensing performance of the fingerprint sensor 310 (e.g., in an optical manner). The processor 120 may increase or decrease a focal length related to a user's touch point to improve fingerprint sensing performance of the fingerprint sensor 310. According to an embodiment, configuration data corresponding to the thickness of the protective member may be stored in the memory 130 in the form of a table (e.g., a table of imaging parameters). The processor 120 may identify the thickness of the protective member, based on the table of imaging parameters stored in the memory 130, and may change the configuration data of the fingerprint sensor 310 configured in response to the identified thickness of the protective member.

According to an embodiment, the processor 120 may obtain a plurality of capacitance data, obtained at a plurality of time points, and may identify a change in the capacitance data that is due to the protective member attached to one surface of the display module 160. The processor 120 may determine that the distance between the touch sensor and the touch point has been changed (e.g., due to the attachment of the protective member, the distance has been increased by the thickness of the protective member). For example, in case that the distance between the touch sensor and the touch point increases, fingerprint sensing performance for the fingerprint sensor 310 may be degraded. For example, the attachment of the protective member may cause the touch point to be out of focus and degrade fingerprint sensing performance. Since the fingerprint sensor 310 is disposed beneath the display module 160, a distance between the fingerprint sensor 310 and the touch point may be increased. In contrast, in case that a distance between the touch sensor and the touch point is reduced due to a removal of the protective member, fingerprint sensing performance for the fingerprint sensor 310 may also be degraded. For example, the removal of the protective member may cause the touch point to be out of focus and degrade fingerprint sensing performance. According to another embodiment, in case that the distance between the touch sensor and the touch point decreases due to the removal of the protective member, the processor 120 may restore the configuration data for the fingerprint sensor 310 to a default value (e.g., an initial configuration value). According to an embodiment, the processor 120 may identify an amount of change in the distance between the touch sensor and the touch point, and may identify configuration data for the fingerprint sensor 310 (e.g., configuration data that provides optimal fingerprint sensing performance) based on the identified amount of change. In an embodiment, the processor 120 may adjust the configuration data for the fingerprint sensor 310 in response to a situation in which the distance between the touch sensor and the touch point fluctuates.

According to an embodiment, the processor 120 may adjust the configuration data for the fingerprint sensor 310 to maintain fingerprint sensing performance for the fingerprint sensor 310. According to an embodiment, the processor 120 may adjust the configuration data for the fingerprint sensor 310 based on a thickness of the protective member. According to an embodiment, configuration data corresponding to the thickness of the protective member may be stored in the memory 130 in the form of a table (e.g., a table of imaging parameters). According to an embodiment, in case that the fingerprint sensor 310 is an ultrasonic fingerprint sensor, the processor 120 may change an ultrasonic frequency, and/or change a capture time point (e.g., timing) for a fingerprint image based on the table of imaging parameters. For example, as a physical distance between the ultrasonic fingerprint sensor and the touch point increases, the processor 120 may increase or decrease an ultrasonic frequency, and may pull faster or push back slower a capture time point for a touch point. According to another embodiment, in case that the fingerprint sensor 310 is an optical fingerprint sensor, the processor 120 may change luminance of a light source, change integration time (e.g., timing), or change a focal length for a user's touch point based on the table of imaging parameters. For example, as a physical distance between the optical fingerprint sensor and the touch point has increased, luminance of a light source may be adjusted to be brighter, integration time may be adjusted to decrease or increase, or a focal length to the touch point may be adjusted to be relatively farther away.

According to an embodiment, in case that a protective member is attached to the display module 160, the electronic device 101 may identify, based on capacitance data, that a distance between the touch sensor (e.g., touch panel) and the touch point (e.g., touch sensing area) has physically increased. For example, when a distance between a sensor and a sensing area physically increases, sensing performance for the sensor may be degraded. The electronic device 101 may identify a distance between the touch sensor and the touch point (e.g., identify a thickness of the protective member), and adjust the configuration data for the fingerprint sensor 310 based on the identified distance. The electronic device 101 may adjust the configuration data for the fingerprint sensor 310 such that sensing performance for the fingerprint sensor 310 is at least partially improved.

Figure 5A:
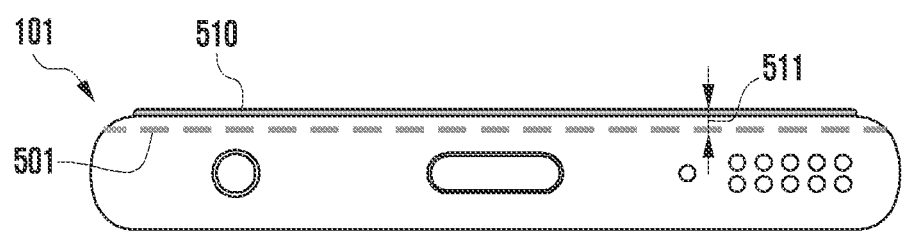
FIG. 5A is an exemplified view illustrating a first distance between a touch sensor and a touch point when a first thickness of protective member is attached to a display according to an embodiment of the disclosure.
Figure 5B:
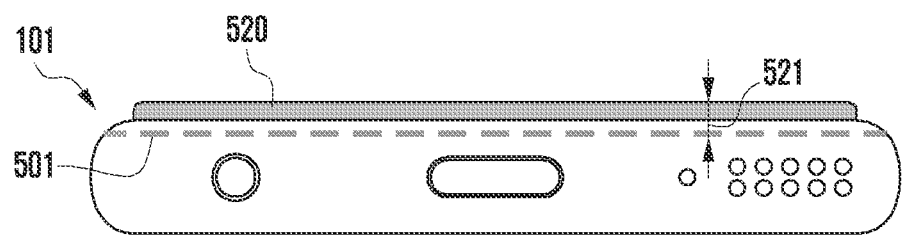
FIG. 5B is an exemplified view illustrating a second distance between the touch sensor and the touch point when a second thickness of protective member is attached to the display according to an embodiment of the disclosure.
Figure 5C:
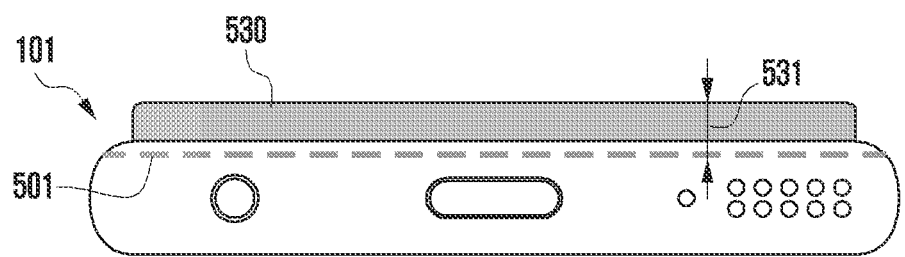
FIG. 5C is an exemplified view illustrating a third distance between the touch sensor and the touch point when a third thickness of protective member is attached to the display according to an embodiment of the disclosure.

FIG. 5A is an exemplified view illustrating a first distance between a touch sensor and a touch point when a first thickness of protective member is attached to a display according to an embodiment of the disclosure. FIG. 5B is an exemplified view illustrating a second distance between the touch sensor and the touch point when a second thickness of protective member is attached to the display according to an embodiment of the disclosure. FIG. 5C is an exemplified view illustrating a third distance between the touch sensor and the touch point when a third thickness of protective member is attached to the display according to an embodiment of the disclosure.

The electronic device 101 in FIGS. 5A, 5B, and 5C may be at least partially similar to the electronic device 101 in FIG. 1, the electronic device 101 in FIG. 2, and/or the electronic device 101 in FIG. 3, or may further include other embodiments of the electronic device 101.

According to an embodiment, the electronic device 101 may include a fingerprint sensor (e.g., the fingerprint sensor 310 in FIG. 3) disposed at least partially beneath (e.g., on a rear surface of) the display module (e.g., the display module 160 in FIG. 3) to obtain fingerprint information based on a touch input received by means of the display module 160. The electronic device 101 may be in a state in which a protective member 510, 520, and 530 (e.g., a protective film, or tempered glass) is at least partially attached to a surface of the display module 160 to protect the display module 160 from cracking or scratching due to an impact generated by an external environment. For example, in case that the protective member 510, 520, and 530 is attached to the surface of the display module 160, the protective member 510, 520, and 530 may degrade sensing performance for a touch panel 501 and/or fingerprint sensor 310 included in the display module 160 of the electronic device 101.

Referring to FIGS. 5A, 5B, and 5C, the electronic device 101 is illustrated from a viewpoint along the y-axis direction in FIG. 2 (e.g., in a direction toward +Y from −Y). Referring to FIGS. 5A, 5B, and 5C, the display module 160 of the electronic device 101 may be implemented as a plurality of panels stacked together, and may include a touch panel 501 (e.g., a touchscreen panel, touch sensor, touch sensor controller, touch display) to obtain a user's touch input. The touch panel 501 may be electrically connected to a touch IC and may obtain capacitance data in response to a user's touch input. According to an embodiment, a touch sensor may be interpreted to include the touch panel 501 and touch IC. For example, the touch panel 501 may be disposed close to a front surface of the electronic device 101 (e.g., the first surface 210A in FIG. 2) to more accurately obtain a user's touch input.

FIG. 5A illustrates a situation in which a relatively thinnest first thickness of protective member 510 is attached to one surface (e.g., the first surface 210A) of the display module 160. FIG. 5B illustrates a situation in which a relatively medium-thick second thickness protective member 520 is attached to one surface (e.g., the first surface 210A) of the display module 160. FIG. 5C illustrates a situation in which a relatively thickest third thickness of protective member 530 is attached to one surface (e.g., the first surface 210A) of the display module 160. For example, the second thickness may be a thickness that is twice as thick relative to the first thickness, and the third thickness may be a thickness that is three times as thick relative to the first thickness. According to an embodiment, as a thickness of the protective member increases, a physical distance between the touch panel 501 and a touch point (e.g., the first surface 210A) may increase.

Referring to FIG. 5A, the electronic device 101 may have the first thickness of protective member 510 attached to one surface (e.g., a surface, the first surface 210A) of the display module 160. The display module 160 includes the touch panel 501, and a processor of the electronic device 101 (e.g., the processor 120 in FIG. 3) may detect a user's touch input by means of the touch panel 501. For example, a user's touch input may occur on a surface of the first thickness of protective member 510. A touch point according to a user's touch input may refer to a surface of the protective member. The processor 120 may obtain capacitance data corresponding to a user's touch input, based on the touch panel 501. According to an embodiment, a physical distance between the touch panel 501 and a touch point (e.g., a first distance 511) may be inversely proportional to a size of capacitance data obtained by means of the touch panel 501. For example, as a physical distance between the touch panel 501 and a touch point increases, a size of capacitance data obtained by means of the touch panel 501 may decrease. According to an embodiment, the processor 120 may determine a physical distance (e.g., the first distance 511) between the touch panel 501 and a touch point based on the amount of change in the capacitance data. The processor 120 may identify a thickness (the first thickness) of the protective member 510.

Referring to FIG. 5B, the electronic device 101 may have the second thickness of protective member 520 attached to one surface (e.g., a surface, the first surface 210A) of the display module 160. For example, the second thickness of protective member 520 may be approximately twice as thick relative to the first thickness of protective member 510 illustrated in FIG. 5A. The processor 120 may obtain capacitance data corresponding to a user's touch input, based on the touch panel 501. According to an embodiment, a physical distance between the touch panel 501 and a touch point (e.g., a second distance 521) may be inversely proportional to a size of capacitance data obtained by means of the touch panel 501. For example, as a physical distance between the touch panel 501 and a touch point increases, a size of capacitance data obtained by means of the touch panel 501 may decrease. According to an embodiment, the processor 120 may determine a physical distance (e.g., the second distance 521) between the touch panel 501 and a touch point based on the amount of change in the capacitance data. The processor 120 may identify a thickness (the second thickness) of the protective member 520.

Referring to FIG. 5C, the electronic device 101 may have the third thickness of protective member 530 attached to one surface (e.g., a surface, the first surface 210A) of the display module 160. For example, the third thickness of protective member 530 may be approximately three times as thick relative to the first thickness of protective member 510 illustrated in FIG. 5A. The processor 120 may obtain capacitance data corresponding to a user's touch input, based on the touch panel 501. According to an embodiment, a physical distance between the touch panel 501 and a touch point (e.g., a third distance 531) may be inversely proportional to a size of capacitance data obtained by means of the touch panel 501. For example, as a physical distance between the touch panel 501 and a touch point increases, a size of capacitance data obtained by means of the touch panel 501 may decrease. According to an embodiment, the processor 120 may determine a physical distance (e.g., the third distance 531) between the touch panel 501 and a touch point based on the amount of change in the capacitance data. The processor 120 may identify a thickness (the third thickness) of the protective member 530.

According to an embodiment, the processor 120 of the electronic device 101 may detect a plurality of touch inputs to the display module 160, which are input at a plurality of time points, and may measure capacitance data for the plurality of touch inputs. For example, a protective member may be at least partially attached to a surface of the display module 160. The electronic device 101 may have stored capacitance data that was measured before a protective member was attached to the display module 160 in a memory (e.g., the memory 130 in FIG. 3). The processor 120 may compare a first capacitance data stored in the memory 130 to a second capacitance data with a protective member attached to a surface of the display module 160, and may identify a thickness for the protective member. According to an embodiment, upon attachment of a protective member, a physical distance (e.g., the first distance 511, the second distance 521, the third distance 531) between a touch panel included in the display module 160 and a touch point may be increased by a thickness of the protective member, thereby reducing capacitance data measured based on a touch input. For example, sensing performance for touch sensors (e.g., a touch panel and touch IC) may be relatively reduced.

Figure 6:
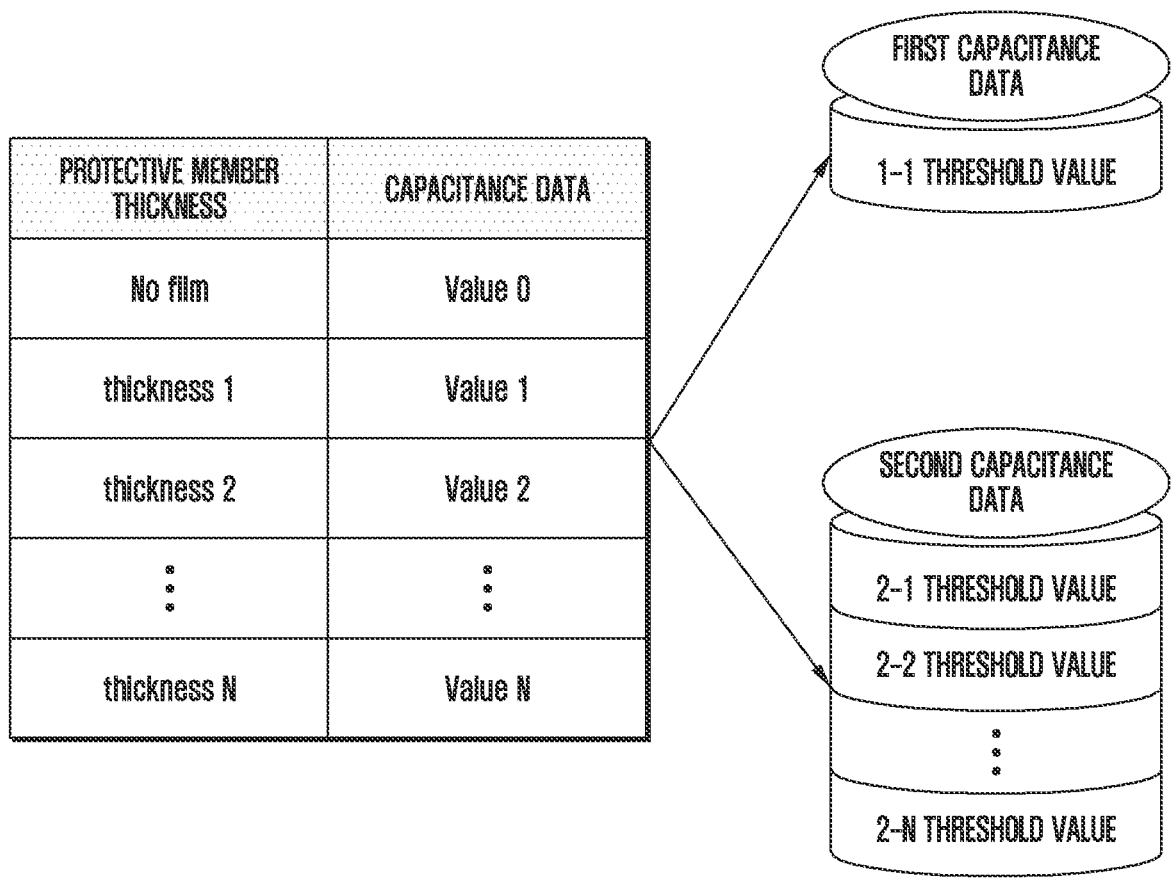
FIG. 6 is a view illustrating a table of configured capacitance data based on a thickness of a protective member according to an embodiment of the disclosure.

FIG. 6 is a view illustrating a table of configured capacitance data based on a thickness of a protective member according to an embodiment of the disclosure.

The electronic device 101 in FIG. 6 may be at least partially similar to the electronic device 101 in FIG. 1, the electronic device 101 in FIG. 2, and/or the electronic device 101 in FIG. 3, or may further include other embodiments of the electronic device 101.

Referring to FIG. 6, in a situation in which a protective member is attached to a surface of a display module (e.g., the display module 160 in FIG. 3), the electronic device 101 may measure capacitance data based on a thickness of the protective member by experimentation (e.g., testing). According to an embodiment, the electronic device 101 may store a "thickness of a protective member" and "capacitance data" measured in response to the "thickness of a protective member" in a memory (e.g., the memory 130 in FIG. 3) in the form of a table (e.g., a capacitance table).

For example, in case that a protective member (e.g., the protective member 320 in FIG. 2) is not attached, the electronic device 101 may measure capacitance data of value 0. When a first thickness (e.g., thickness1) of protective member is attached to a surface of the display module 160, the electronic device 101 may measure capacitance data of value1, and when a second thickness (e.g., thickness2) of protective member is attached to a surface of the display module 160, the electronic device 101 may measure capacitance data of value2. According to an embodiment, the electronic device 101 may determine, based on the measured capacitance data, whether a protective member is attached to a surface of the display module 160, and/or determine what a thickness of the attached protective member is.

According to an embodiment, the electronic device 101 may identify a thickness of a protective member attached to the display module 160 based on capacitance data measured at a plurality of time points.

According to another embodiment, a protective member may include a variety of materials, such as a polyethylene terephthalate (PET) based film (e.g., protective film) and/or a glass based film (e.g., tempered glass). For example, a table based on capacitance data (e.g., a capacitance table) may be stored in memory 130 by type of protective member. According to another embodiment, the electronic device 101 may identify a thickness of a protective member, according to a type of protective member, based on the measured capacitance data.

Referring to FIG. 6, capacitance data based on a thickness of a protective member may be divided into a first capacitance data and a second capacitance data, in which a first threshold value (e.g., a 1-1 threshold value) may be stored in the first capacitance data, and a second threshold value (e.g., a 2-1 threshold value, a 2-2 threshold value, and/or a 2-N threshold value) may be stored in the second capacitance data. For example, the first threshold value may include a single threshold value (e.g., the 1-1 threshold value), and may be utilized as a reference value to select one of an ON operation and an OFF operation for a specific function. For example, the second threshold may include a plurality of threshold values (e.g., the 2-1 threshold value, the 2-2 threshold value, and/or the 2-N threshold value), and may be utilized as a reference value to selectively perform various functions corresponding to a thickness of a protective member. According to an embodiment, the electronic device 101 may be configured with a plurality of threshold values (e.g., the 2-1 threshold value, the 2-2 threshold value, and/or the 2-N threshold value), and may perform different operations in response to a situation in which the measured capacitance data exceeds the respective threshold values. For example, the plurality of threshold values may be configured as sequentially increasing or sequentially decreasing values.

According to an embodiment, a plurality of tables corresponding to different types of protective members may be stored in the memory 130. For example, a first protective member and a second protective member, each may be configured with different tables. For example, the electronic device 101 may configure a plurality of threshold values based on protective members (e.g., a first protective member, or a second protective member), and may control an operation of the electronic device 101 to perform different operations in response to a situation in which each threshold value is exceeded.

According to an embodiment, the electronic device 101 may identify a thickness of a protective member attached to a surface of the display module 160, based on the capacitance table of FIG. 6, and may adjust configuration data for a fingerprint sensor (e.g., the fingerprint sensor 310 in FIG. 3) disposed beneath the display module 160 based on the identified thickness of the protective member. For example, as a thickness of a protective member may decrease, sensing performance of the fingerprint sensor 310 may be degraded. Therefore, the configuration data for the fingerprint sensor 310 may be adjusted higher to improve sensing performance.

According to an embodiment, in adjusting the configure data for the fingerprint sensor 310, the electronic device 101 may configure a first threshold value, and may adjust the configuration data for the fingerprint sensor 310 under a condition in which the measured capacitance data exceeds the configured first threshold value. For example, the first threshold value may be a reference value to adjust the configuration data of the fingerprint sensor 310. Referring to FIG. 6, the electronic device 101 may configure a first capacitance data (e.g., value1) corresponding to a protective member of a first thickness (e.g., thickness1) as a first threshold value. For example, the electronic device 101 may identify a thickness of a protective member based on the measured capacitance data in response to a situation in which capacitance data measured at a plurality of time points exceeds the configured first threshold.

According to an embodiment, the capacitance table in FIG. 6 is not limited to a specific type of protective member and may be updated based on the configured time. According to an embodiment, the electronic device 101 may determine whether various types of protective members are attached, and may configure a plurality of threshold values in response to a specific protective member. The electronic device 101 may also adjust configuration information for the sensor module 310 to vary based on a plurality of threshold values.

FIG. 7 is a view illustrating a table for adjusting configuration data for the fingerprint sensor based on the thickness of the protective member according to an embodiment of the disclosure.

The electronic device 101 in FIG. 7 may be at least partially similar to the electronic device 101 in FIG. 1, the electronic device 101 in FIG. 2, and/or the electronic device 101 in FIG. 3, or may further include other embodiments of the electronic device 101.

Referring to FIG. 7, the electronic device 101 may store in a memory (e.g., the memory 130 in FIG. 3) a table that adjusts configuration data differently by type of fingerprint sensor (e.g., the fingerprint sensor 310 in FIG. 3) when a protective member (e.g., the protective member 320 in FIG. 2) is attached to a surface of a display module (e.g., the display module 160 in FIG. 3). For example, the fingerprint sensor 310 may be disposed at least partially beneath (e.g., on a rear surface of) the display module 160. The fingerprint sensor 310 may obtain fingerprint information based on a touch input to the display module 160, using a method of at least partially penetrating the display module 160.

Referring to FIG. 7, the fingerprint sensor 310 may include a first fingerprint sensor that uses ultrasound signals to obtain fingerprint information (in an ultrasonic manner) or a second fingerprint sensor that uses optical signals (e.g., a light source) to obtain fingerprint information (in an optical manner). According to an embodiment, the fingerprint sensor 310 is not limited to any specific way, and configuration data may vary depending on the way. According to an embodiment, configuration data corresponding to the thickness of the protective member may be stored in the memory 130 in the form of a table (e.g., a table of imaging parameters). Referring to FIG. 7, the first fingerprint sensor, which is an ultrasonic manner, may configure at least one of an ultrasonic frequency or a capture time point for a fingerprint image as the configuration data. The second fingerprint sensor, which is an optical manner, may configure at least one of luminance data (e.g., luminance value) of a light source, integration time, or a focal length for a fingerprint image as the configuration data. According to an embodiment, a processor of the electronic device 101 (e.g., the processor 120 in FIG. 3) may identify a thickness of a protective member, based on a table of imaging parameters stored in the memory 130, and may change the configuration data of a fingerprint sensor (e.g., the first fingerprint sensor and the second fingerprint sensor) that is configured in response to the identified thickness of the protective member.

According to an embodiment, the electronic device 101 may identify a thickness of a protective member attached to a first side of the display module 160 based on a change in capacitance data in response to a user's touch input, and may adjust the configuration data for the fingerprint sensor 310 based on the identified thickness of the protective member. For example, as a thickness of a protective member increases, a distance between the fingerprint sensor 310 and a touch point (e.g., a user's touch input point on the protective member) increases, and sensing performance for the fingerprint sensor 310 may be degraded. The electronic device 101 may adjust the configuration data in a manner that improves sensing performance for the fingerprint sensor 310.

For example, in case that the fingerprint sensor 310 disposed beneath (e.g., on a rear surface) of the display module 160 is the first fingerprint sensor that is in an ultrasonic manner, the processor 120 of the electronic device 101 may adjust at least one of an ultrasonic frequency or a capture time point for a fingerprint image. For example, the processor 120 may adjust the ultrasonic frequency such that the ultrasonic frequency is increased and/or decreased in a manner that improves sensing performance of the first fingerprint sensor. For example, the processor 120 may pull faster or push back slower the capture time point in a manner that improves sensing performance of the first fingerprint sensor.

For example, in case that the fingerprint sensor 310 disposed beneath (e.g., on a rear surface) of the display module 160 is a second fingerprint sensor that is an optical manner, the processor 120 of the electronic device 101 may adjust at least one of luminance of a light source, integration time, or a focal length for a fingerprint image. For example, the processor 120 may adjust luminance of a light source in a manner that improves sensing performance of the second fingerprint sensor. The processor 120 may adjust luminance of a light source higher, as a distance between the second fingerprint sensor and a touch point increases due to the lack of a protective member. The processor 120 may lengthen and/or shorten integration time in a manner that improves sensing performance of the second fingerprint sensor. The processor 120 may adjust a focal length for a fingerprint image in a manner that improves sensing performance of the second fingerprint sensor. Due to the lack of a protective member, a distance from the second fingerprint sensor to a touch point (e.g., a fingerprint image) relatively increases, and the processor 120 may adjust the configuration data to increase a focal length to obtain a more accurate fingerprint image.

According to an embodiment, in case that a protective member is attached to one surface of the display module 160, the electronic device 101 may identify, based on capacitance data, that a distance between the touch panel and a touch point (e.g., a touch sensing area, a user's touch input point on the protective member) has physically increased. For example, as a distance between a sensor (e.g., the fingerprint sensor 310) and a sensing point (e.g., a touch point) physically increases, sensing performance for the sensor may be degraded. The touch panel may be electrically connected to the touch IC and may be understood as a touch sensor. The electronic device 101 may identify a distance between the touch panel and a touch point based on the capacitance data (e.g., identify a thickness of a protective member), and may adjust the configuration data for the fingerprint sensor 310 (e.g., the ultrasonic first fingerprint sensor, the optical second fingerprint sensor) based on the identified distance. The electronic device 101 may adjust the configure data for the fingerprint sensor 310 to at least partially improve sensing performance for the fingerprint sensor 310 in a situation in which a protective member is attached to the display module 160.

According to an embodiment, in case that the fingerprint sensor 310 disposed beneath (e.g., on a rear surface) of the display module 160 is the first fingerprint sensor that is in an ultrasonic manner, the electronic device 101 may adjust at least one of an ultrasonic frequency or a capture time point for a fingerprint image. For example, the electronic device 101 may adjust at least one of an ultrasonic frequency or a capture time point for a fingerprint image in a manner that improves sensing performance for the first fingerprint sensor.

According to an embodiment, in case that the fingerprint sensor 310 disposed beneath (e.g., on a rear surface) of the display module 160 is a second fingerprint sensor that is in an optical manner, the electronic device 101 may adjust at least one of luminance of a light source, integration time, or a focal length for a fingerprint image. For example, the electronic device 101 may adjust at least one of luminance of a light source, integration time or a focal length for a fingerprint image in a manner that improves sensing performance for the second fingerprint sensor.

In a method of adjusting configuration data for a fingerprint sensor (e.g., the fingerprint sensor 310 in FIG. 3) disposed beneath a display (e.g., the display module 160 in FIGS. 1 and/or 3) according to various embodiments, in response to a touch input to a touch panel included in the display 160, capacitance data corresponding to the touch input may be obtained. The method according to an embodiment may identify the thickness of the protective member attached to the display 160 based on the obtained capacitance data. The method according to an embodiment may adjust the configuration data for the fingerprint sensor 310 based on the identified thickness of the protective member.

According to an embodiment, the fingerprint sensor 310 is disposed at least partially on a rear surface of the display 160, and fingerprint information may be obtained via a fingerprint sensing area formed based on a position in which the fingerprint sensor 310 is disposed.

The method according to an embodiment may further includes detecting a touch input via the fingerprint sensing area, and obtaining fingerprint information based on the touch input using the fingerprint sensor 310 configured based on the configuration data.

The method according to an embodiment may further include identifying a distance between the touch panel and a touch point at which a touch input occurs based on the obtained capacitance data, and adjusting the configuration data for the fingerprint sensor 310 based on the identified distance.

In the method according to an embodiment, as the distance between the touch panel and the touch point increases, the amount of change in the capacitance data corresponding to the touch input becomes greater, and the amount of change in the configuration data may be determined based on the amount of change in the capacitance data.

According to an embodiment, the fingerprint sensor 310 may include a first fingerprint sensor in an ultrasound manner (e.g., a first fingerprint sensor in FIG. 7) that uses ultrasound signals to obtain fingerprint information, and a second fingerprint sensor in an optical manner (e.g., a second fingerprint sensor in FIG. 7) that uses an optical signals to obtain fingerprint information.

According to an embodiment, configuration data for the first fingerprint sensor may include an ultrasonic frequency and a capture time point for obtaining the fingerprint information. The adjusting of the configuration data, according to an embodiment, may include adjusting the configuration data of at least one of an ultrasonic frequency or a capture time point, in adjusting the configuration data for the first fingerprint sensor.

According to an embodiment, the configuration data for the second fingerprint sensor may include luminance data of the light source, integration time, and a focal length to obtain fingerprint information. The adjusting of the configuration data, according to an embodiment, may include adjusting the configuration data of at least one of luminance data, integration time, or a focal length, in adjusting the configuration data for the second fingerprint sensor.

The method according to an embodiment may further include configuring a threshold value corresponding to the capacitance data based on a table stored in memory 130; and identifying the thickness of the protective member according to a type of protective member attached to the display based on the capacitance data when the obtained capacitance data exceeds the configured threshold value. The memory 130 may store a table that is implemented based on a thickness of a protective member, capacitance data configured in response to the thickness of the protective member, a type of protective member, and capacitance data configured in response to the type of protective member.

According to an embodiment, the protective member may include at least one of a polyethylene terephthalate (PET) based film or a glass based film.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. It is intended that features described with respect to separate embodiments, or features recited in separate claims, may be combined unless such a combination is explicitly specified as being excluded or such features are incompatible. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a touch display including a touch sensor controller;
a fingerprint sensor disposed beneath the touch display;
memory storing one or more computer programs; and
one or more processors communicatively coupled to the touch display, the fingerprint sensor, and the memory,
wherein the one or more computer programs include computer-executable instructions that, when executed by the one or more processors, cause the electronic device to:
in response to a touch input to the touch display, obtain, via the touch sensor controller, capacitance data,
identify a type of a protective member attached to the touch display and a thickness of the protective member based on the capacitance data and a table of imaging parameters,
select, when the fingerprint sensor is an ultrasonic fingerprint sensor, a first configuration value corresponding to the identified type and the identified thickness of the protective member among configuration values corresponding to the ultrasonic fingerprint sensor included in the table of imaging parameters,
obtain fingerprint information corresponding to the touch input, using the ultrasonic fingerprint sensor operating with the selected first configuration value,
select, when the fingerprint sensor is an optical fingerprint sensor, a second configuration value corresponding to the identified type and the identified thickness of the protective member among configuration values corresponding to the optical fingerprint sensor included in the table of imaging parameters, and
obtain fingerprint information corresponding to the touch input, using the optical fingerprint sensor operating with the selected second configuration value,
wherein the table of imaging parameters is implemented based on a thickness of a protective member, and a type of a protective member corresponding to capacitance data,
wherein the first configuration value is associated with an ultrasonic frequency and a capture time point to obtain the fingerprint information, and
wherein the second configuration value is associated with luminance data of a light source, integration time, and a focal length to obtain the fingerprint information.

2. The electronic device of claim 1,
wherein the first configuration value and the second configuration value are determined based on the identified thickness and the identified type of the protective member.

3. The electronic device of claim 2,
wherein the table of imaging parameters further includes the thickness of the protective member, first capacitance data configured in response to the thickness of the protective member, the type of the protective member, and second capacitance data configured in response to the type of the protective member, and are stored in the memory, and
wherein the one or more computer programs include further computer-executable instructions that, when executed by the one or more processors, cause the electronic device to:
configure a threshold value corresponding to the capacitance data based on the table of imaging parameters stored in the memory, and
identify the thickness of the protective member according to the type of protective member attached to the touch display based on the capacitance data and the table of imaging parameters when the capacitance data exceeds the configured threshold value.

4. The electronic device of claim 2, wherein the protective member comprises at least one of a polyethylene terephthalate (PET) based film or a glass based film.

5. The electronic device of claim 1,
wherein the fingerprint sensor is disposed at least partially on a rear surface of the touch display, and
wherein the fingerprint sensor obtains the fingerprint information via a fingerprint sensing area of the display that corresponds to a position at which the fingerprint sensor is disposed.

6. The electronic device of claim 5, wherein the one or more computer programs include further computer-executable instructions that, when executed by the one or more processors, cause the electronic device to:
- detect a touch input entered via the fingerprint sensing area of the display, and
- obtain the fingerprint information according to the detected touch input using the fingerprint sensor operating with one of the first configuration value and the second configuration value.

7. The electronic device of claim 1, wherein the one or more computer programs include further computer-executable instructions that, when executed by the one or more processors, cause the electronic device to:
- identify a distance between the touch display and a touch point at which the touch input occurs based on the capacitance data, and
- select one of the first configuration value and the second configuration value for the fingerprint sensor based on the identified distance.

8. The electronic device of claim 7,
- wherein an amount of change in the capacitance data corresponding to the touch input is greater when the identified distance increases, and
- wherein an amount of change in one of the first configuration value and the second configuration value is determined based on the amount of change in the capacitance data.

9. The electronic device of claim 1, wherein the processor, to obtain, in response to the touch input to the touch display, the capacitance data corresponding to the touch input, is further configured to obtain, in response to the touch input to the touch display, the capacitance data corresponding to the touch input at a plurality of time points.

10. A method performed by an electronic device for a fingerprint sensor of the electronic device disposed beneath a touch display of the electronic device, the method comprising:
- obtaining, in response to a touch input to the touch display, capacitance data;
- identifying a type of a protective member attached to the touch display and a thickness of the protective member based on the capacitance data and a table of imaging parameters;
- selecting, when the fingerprint sensor is an ultrasonic fingerprint sensor, a first configuration value corresponding to the identified type and the identified thickness of the protective member among configuration values corresponding to the ultrasonic fingerprint sensor included in the table of imaging parameters;
- obtaining fingerprint information corresponding to the touch input, using the ultrasonic fingerprint sensor operating with the selected first configuration value;
- selecting, when the fingerprint sensor is an optical fingerprint sensor, a second configuration value corresponding to the identified type and the identified thickness of the protective member among configuration values corresponding to the optical fingerprint sensor included in the table of imaging parameters; and
- obtaining fingerprint information corresponding to the touch input, using the optical fingerprint sensor operating with the selected second configuration value,
- wherein the table of imaging parameters is implemented based on a thickness of a protective member and a type of a protective member corresponding to capacitance data,
- wherein the first configuration value is associated with an ultrasonic frequency and a capture time point to obtain the fingerprint information, and
- wherein the second configuration value is associated with luminance data of a light source, integration time, and a focal length to obtain the fingerprint information.

11. The method of claim 10,
- wherein the first configuration value and the second configuration value are determined based on the identified thickness and the identified type of the protective member.

12. The method of claim 11, further comprising:
- detecting a touch input entered via the fingerprint sensing area of the display; and
- obtaining the fingerprint information according to the detected touch input using the fingerprint sensor operating with one of the first configuration value and the second configuration value.

13. The method of claim 10,
- wherein the fingerprint sensor is disposed at least partially on a rear surface of the touch display, and
- wherein the fingerprint sensor obtains the fingerprint information via a fingerprint sensing area of the display that corresponds to a position at which the fingerprint sensor is disposed.

14. The method of claim 10, further comprising:
- identifying a distance between the touch display and a touch point at which the touch input occurs based on the capacitance data; and
- selecting one of the first configuration value and the second configuration value for the fingerprint sensor based on the identified distance.

* * * * *